United States Patent [19]
Anderson et al.

[11] Patent Number: 6,058,161
[45] Date of Patent: *May 2, 2000

[54] SYSTEM AND METHOD FOR PROGRAMMABLE TELEPHONE SUBSCRIBER LINE TEST

[75] Inventors: Jeffrey Jay Anderson; Yan Zhou; Merle L. Miller, all of Austin, Tex.

[73] Assignee: Advanced Micro Devices, Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,986

[22] Filed: Jun. 20, 1997

[51] Int. Cl.[7] .............................. H04M 1/24; H04M 3/08; H04M 3/22

[52] U.S. Cl. .................................. 379/27; 379/1; 379/12; 379/30

[58] Field of Search .................................. 379/26, 27, 29, 379/1, 9–10, 15, 12, 30, 21

[56] References Cited

U.S. PATENT DOCUMENTS

| | | | |
|---|---|---|---|
| 4,991,105 | 2/1991 | Pimental | 379/26 |
| 5,003,573 | 3/1991 | Agah et al. | 379/27 |
| 5,063,585 | 11/1991 | Shapiro | 379/27 |
| 5,218,616 | 6/1993 | Stepens | 379/27 |
| 5,222,119 | 6/1993 | Asano | 379/29 |
| 5,436,953 | 7/1995 | Nilson | 379/27 |
| 5,440,612 | 8/1995 | Siligoni et al. | 379/27 |
| 5,511,108 | 4/1996 | Severt et al. | 379/1 |
| 5,521,959 | 5/1996 | Walsworth et al. | 379/27 |
| 5,528,661 | 6/1996 | Siu et al. | 379/27 |
| 5,625,667 | 4/1997 | Vogt, III et al. | 379/1 |
| 5,661,776 | 8/1997 | Charland | 379/29 |
| 5,699,402 | 12/1997 | Bauer et al. | 379/26 |
| 5,742,671 | 4/1998 | Parkerson et al. | 379/1 |
| 5,956,386 | 9/1999 | Miller | 379/27 |

OTHER PUBLICATIONS

Am79212/Am79C202 Advanced Subscriber Line Interface Circuit, Dec. 19, 1995, Chapter 8, 9, and 10.
Understanding Telephones, Julian Macassey, Sep. 1985, pp. 1–9 (Obtained from the Internet at http://jedi.cis.temple.edu:8080/elite/begin/phonewrk.how).

*Primary Examiner*—Paul Loomis
*Assistant Examiner*—Binh K. Tieu
*Attorney, Agent, or Firm*—Williams, Morgant & Amerson, P.C.

[57] ABSTRACT

A system and method for providing software-implemented, programmable testing of telephone subscriber line power conditions. The system detects subscriber line faults including resistive faults and foreign voltages on a telephone subscriber line. A user interface is provided to enter user-programmable threshold values corresponding to subscriber line fault conditions. A fault threshold memory is coupled to the user interface to store the generated threshold values. A processing unit is configured and arranged to compare signal attributes on the telephone subscriber line to the generated threshold values stored in the fault threshold memory, and is further configured and arranged to identify an occurrence of a fault corresponding to a predetermined condition introduced onto the telephone subscriber line in response thereto.

29 Claims, 6 Drawing Sheets

SYSTEM AND METHOD FOR PROGRAMMABLE TELEPHONE SUBSCRIBER LINE TEST

FIELD OF THE INVENTION

The present invention is directed generally to telephone subscriber line power supervision, and more particularly to a system and method for providing software-implemented testing of telephone subscriber line power conditions, off-site from the central office, using programmable fault thresholds.

BACKGROUND OF THE INVENTION

The telephone subscriber loop is the portion of a telecommunications circuit which connects the central office to the customer premise equipment. The subscriber loop, often referred to as the local loop or "last mile", comprises a two-wire twisted-pair cable to provide full duplex communications between the subscriber and the central office.

The local loop is the most expensive, and perhaps the least technically effective, portion of the entire telecommunications system today. The subscriber loop is the most susceptible to transmission impairment. This is largely due to the subscriber loop being exposed to the elements as it hangs on poles to reach the end user. The local loop cable may also be buried in the the ground in conduit, which is susceptible to being inadvertently cut or damaged. In such cases, the current-carrying portion of the cable may become wet, causing communications to degrade or cease to exist altogether.

The principal types of faults which can occur on the subscriber loop are short-circuits, power cross faults, grounds, and open-circuits. For example, a short-circuit would include the tip and ring lines being short-circuited together. A power cross involves a short-circuit between the tip and ring lines of two different telephone lines, or may involve a short-circuit between the telephone line and an electrical power line. A short-circuit between the ring line and ground is considered a ground fault, while a discontinuity in a line is referred to as an open cable pair. Power crosses and grounds are often the result of wet cable, which causes current flow between conductors.

There have traditionally been three categories of telephone subscriber line testing. First, local test desks (LTD) have been used to access a cable pair through the switching system at the central office. The LTD is a manually operated system which accesses the cable pair through a circuit in the switching system that connects the LTD to the line without ringing the telephone. Such a test requires dedicated test circuitry and a test board operator at the central office.

Another type of telephone subscriber line testing is automatic test equipment that accesses local loops through the switching system, simmilar to that of the LTD tests. Such a test is the line insulation test (LIT), which is performed at the central office by stepping through each telephone line and applying a line test.

Manual loop tests can be performed using a device called a time domain reflectometer (TDR). The TDR locates loop faults by sending a pulse on the telephone line, and displays the reflected pulse which can provide the distance to the fault. TDRs are generally very expensive.

In order to more closely locate the location at which a fault occurs on the telephone line, one must properly distinguish between outside plant troubles and problems with the subscriber's wiring and customer premises equipment (CPE). Network interface devices (NID) have been used at the interface between the telephone subscriber's wiring and the telephone company's equipment. The NIDs help to isolate the problem on the telephone line to the subscriber's wiring. One such subscriber line interface circuit is the advanced subscriber line interface circuit (ASLIC) Am79212/Am79C202 commercially available by Advanced Micro Devices, the assignee of the instant application.

However, the aforementioned prior art does not provide for flexibility in performing AC and DC fault detection. The prior art requires complex analog and digital circuitry, thereby requiring additional, valuable semiconductor real estate. For example, the prior art does not lend itself to quick and inexpensive modification of fault thresholds. This may be beneficial where the fault detection circuitry is to be used world-wide where fault characteristics may differ, such as the sinusoidal frequency of electrical power distribution.

The present invention provides a manner in which telephone power line faults may be monitored at the subscriber to local loop interface, while providing flexibility and ease of use. The present invention, therefore, provides a solution to the aforementioned and other shortcomings of the prior art, and provides additional advantages over the prior art.

SUMMARY OF THE INVENTION

Generally, the present invention relates to a system and method for providing software-implemented, programmable testing of telephone subscriber line power conditions.

In accordance with one embodiment of the invention, a system for detecting subscriber line faults including resistive faults and foreign voltages on a telephone subscriber line is provided. The system includes a user interface to enter user-programmable threshold values corresponding to subscriber line fault conditions. A fault threshold memory is coupled to the user interface to store the generated threshold values. A processing unit is configured and arranged to compare signal attributes on the telephone subscriber line to the generated threshold values stored in the fault threshold memory, and is further configured and arranged to identify an occurrence of a fault corresponding to a predetermined condition introduced onto the telephone subscriber line in response thereto.

In accordance with one embodiment of the invention, a system for detecting AC and DC power faults on a telephone subscriber line is provided. A fault threshold memory is coupled to the user interface to store programmable AC and DC threshold values. A DC fault detection circuit includes reference inputs to receive the programmable DC threshold values. The DC fault detection circuit generates DC fault signals upon identifying DC signals on the telephone line signal at levels corresponding to the programmable DC threshold values. An AC fault detection circuit having reference inputs to receive the programmable AC threshold values, and to generate AC fault signals upon identifying AC power levels on the telephone line signal at levels corresponding to the programmable AC threshold values.

In accordance with yet another embodiment of the invention, a power fault detection system for use in identifying power faults on a telephone line is provided. A fault threshold memory to store a threshold value corresponding to a subscriber line fault condition is provided, and a signal quantifier generates a value proportional to a phase-independent, steady-state representation of an AC signal introduced on the telephone line. A processing unit is arranged to compare the generated value to the threshold value, and to identify the AC signals on the telephone line which exceed the threshold value.

In accordance with another embodiment of the invention, a software-implemented method is provided for identifying faults on a telephone subscriber line. Input is received from a user interface corresponding to desired fault threshold values for telephone subscriber line power signals. Digital fault threshold values are generated from the input received. The actual power signals collected from the telephone subscriber line to the digital fault threshold values are compared, and deviant power signals introduced on the telephone subscriber line are identified in response thereto.

In still another embodiment of the invention, a software-implemented method for identifying current faults on a telephone subscriber line at the telephone central office is provided. A digital subscriber line is software-filtered into DC and AC digital voltages. DC and AC programmable threshold values are programmed corresponding to DC and AC subscriber line power fault conditions respectively. The DC and AC programmable threshold values are compared to the DC and AC digital voltages respectively. The AC fault bits are set in a fault status register when the AC digital voltage exceeds the AC programmable threshold value. The DC fault bits are set in the fault status register when the DC digital voltage exceeds the DC programmable threshold value.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention generally provides a system and method for providing software-implemented testing of telephone subscriber line power conditions, off-site from the central office, using programmable fault thresholds. The telephone subscriber line is monitored for short-circuits, ground faults, power crosses, and other problematic power conditions. AC and DC power conditions on the telephone line are compared to AC and DC fault threshold levels respectively. These fault threshold levels are user-programmable using software, to provide flexibility and reduce complexity and hardware. Software is used to manipulate the monitored power measurements from the telephone line, in order to allow the measurement values to be compared to the programmable threshold values using software comparisons.

Figure 1:
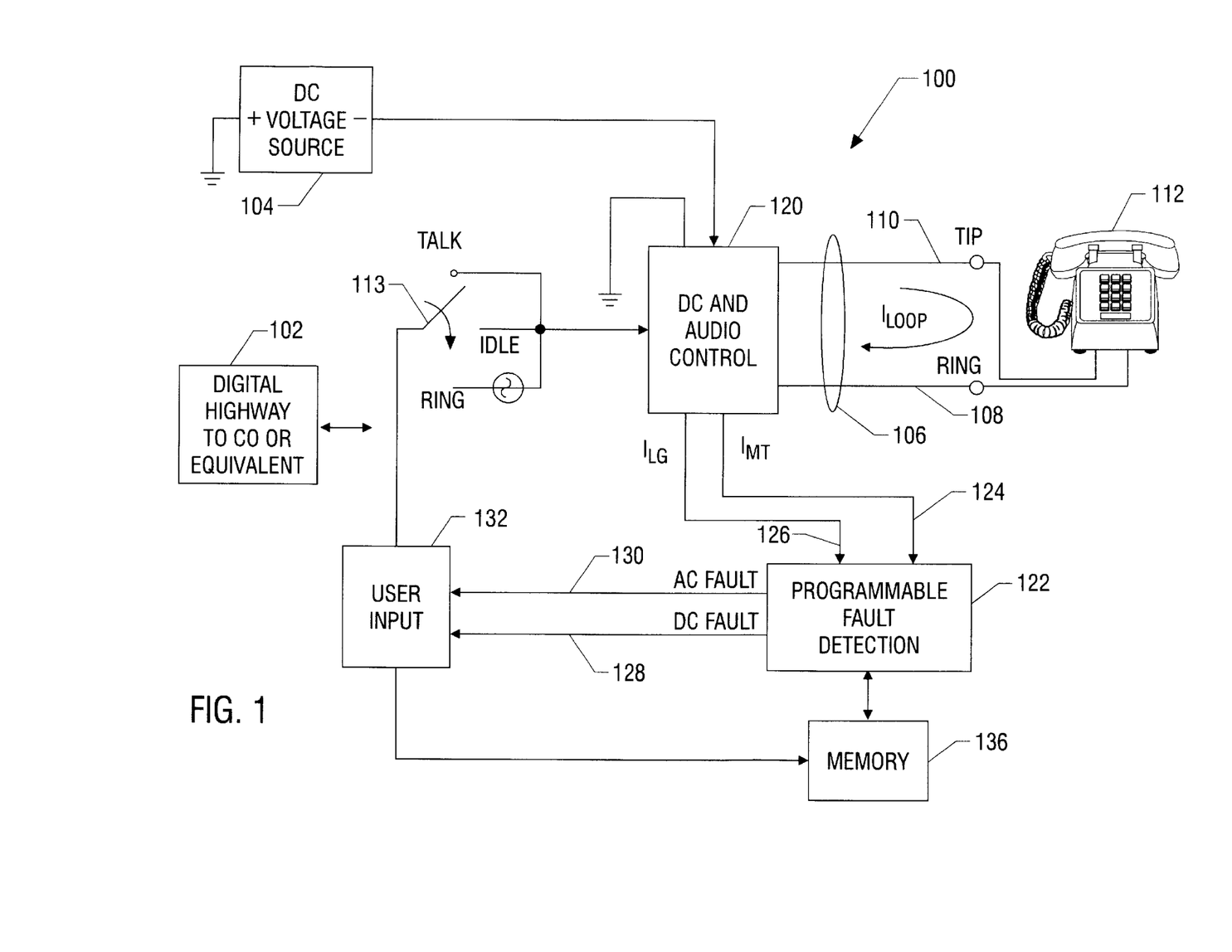
FIG. 1 is a block diagram of one embodiment of a telephone subscriber line and fault detection arrangement in accordance with the present invention.

FIG. 1 is a block diagram of one embodiment of a telephone subscriber line and fault detection arrangement 100 in accordance with the present invention. The circuit 100 resides at the central office of the telephone company, or may alternatively reside at a more remote location from the central office such as a neighborhood or curbside pedestal, which is connected to the central office via a digital highway 102. The central office (CO) represents the telephone line switching center that terminates and interconnects telephone lines and trunks from users. The central office, or other station providing an equivalent service, applies various DC voltages to the two-wire phone loop. The DC voltage is provided by the DC voltage source 104, and typically provides a negative voltage onto the two-wire loop 106. The two-wire phone loop 106 includes the ring line 108 and tip line 110, which provide the communication and power connection to customer premises equipment (CPE), represented in FIG. 1 by the telephone 112. The present invention can also be applied to other systems using two-wire plain old telephone service (POTS) and/or data transmission, such as integrated services digital network (ISDN) and various digital subscriber line (xDSL) technologies, and is not limited to ring/tip line standard telephone systems.

There are several different states in which the phone line operates, depending upon what action is presently being taken with respect to any of the telephonic devices being used by the subscribers. Among these different states are the "talk", "idle", and "ring" communication states, symbolically distinguished in FIG. 1 by switch 113. In the idle state, the central office typically applies −48 (+/−6) volts DC on the ring line 108. There is typically a resistance applied on the local loop during idle mode, as well additional external line resistance between the central office and the subscriber.

When in the talk mode, central office typically applies voltages of −43 volts to −79 volts DC on the ring line 108. In talk mode, the feed characteristics may be optimized according to programmable parameters set by the user. As is well known in the art, voice audio signals are superimposed on the DC voltage presented on the ring and tip lines 108, 110 during talk mode. During the ring state, the central office typically applies approximately 86 volt rms, at 20 Hz, on top of the usual −48 volt DC bias.

While these resistances and voltages vary somewhat, thereby changing the current at the customer premises, expected normal current ranges can be determined for the subscriber's telephony equipment. Those currents falling outside of the expected range may indicate a fault situation. The present invention concerns detection of such fault conditions which may affect the operation or CPE damage susceptability while in idle and talk modes.

Another mode in which the telephone line operates is a test mode, where the central office utilizes dedicated test circuitry to apply various AC and DC test signals to make sure that the network is working properly. It is, however, desirable to provide line test capabilities to identify faults on the line or line circuit without involvement of separate circuitry at the central office. The present invention includes a subscriber line interface and programmable fault detection circuitry 122 to provide an integrated test capability at the subscriber portion of the subscriber loop. The programmable fault detection capabilities of the present invention provides for software-programmable functions, which is beneficial in a variety of situations including world-wide application where telephone line characteristics and fault conditions may differ, and for remote applications where dedicated test hardware is not cost effective.

The DC and audio control circuit 120 is part of a subscriber line interface that provides the power necessary to drive a wide variety of subscriber lines. The DC and audio control circuit 120 receives an analog signal having two components. First, a DC component is present, which controls how much loop or metallic current is flowing in the loop. The other current is an AC voice current superimposed on the DC component. The current is input to the DC and audio control circuit 120, where it is amplified and presented differentially in the tip/ring local loop 106.

The programmable fault detection circuitry 122 provides for software-implemented fault detection through independently software-programmable fault threshold levels. The DC and audio control circuit 120 collects information characteristic to the subscriber loop 106, and provides a metallic loop current $I_{MT}$ and a longitudinal loop current $I_{LG}$ to the programmable fault detection circuitry 122 for fault detection and processing.

The currents $I_{MT}$ and $I_{LG}$, shown on lines 124 and 126 respectively, together substantially account for the total subscriber line loop current $I_{LOOP}$. $I_{LG}$ refers to the common mode current, and $I_{MT}$ refers to the differential current, as is known in the art. Typically, in a normal on-hook telephone circuit under normal conditions, the longitudinal component is relatively small. The occurrence of some type of power fault, such as an external power being short circuited to the telephone line, may result in a longitudinal current $I_{LG}$ which is identified by the present invention to be deviant from the expected current value.

The change in longitudinal current $I_{LG}$ can result from short circuit connections to either DC or AC power/voltage references. A DC fault can occur for a variety of reasons, including resistive short circuits to earth ground, or defective telephone cables which allow moisture and water to short circuit the ring and/or tip lines to another line. Deviant AC currents generally arise in the case where the telephone line is short-circuited to an electric power line. These DC and AC faults are identified by the programmable fault detection circuitry 122, which can generate a DC fault signal 128 and an AC fault signal 130 respectively.

The programmable fault detection circuitry 122 allows for software-programmable threshold values. Desired threshold values may be entered by a user at the user input 132. In one embodiment of the invention, the threshold values are entered via user input 132 using commands with command parameters corresponding to the programmable threshold value. The threshold values may alternatively be generated through the use of an analog-to-digital converter, a stored table of values accessed according to the input string provided, or via other known means. The digital threshold value can be generated in real-time, or can be stored in the memory 136 for later use. In one embodiment of the invention, threshold values for each of the AC and DC faults are stored in the memory 136, and are used by the programmable fault detection circuitry 122 in ascertaining whether a power fault exists.

Figure 2:
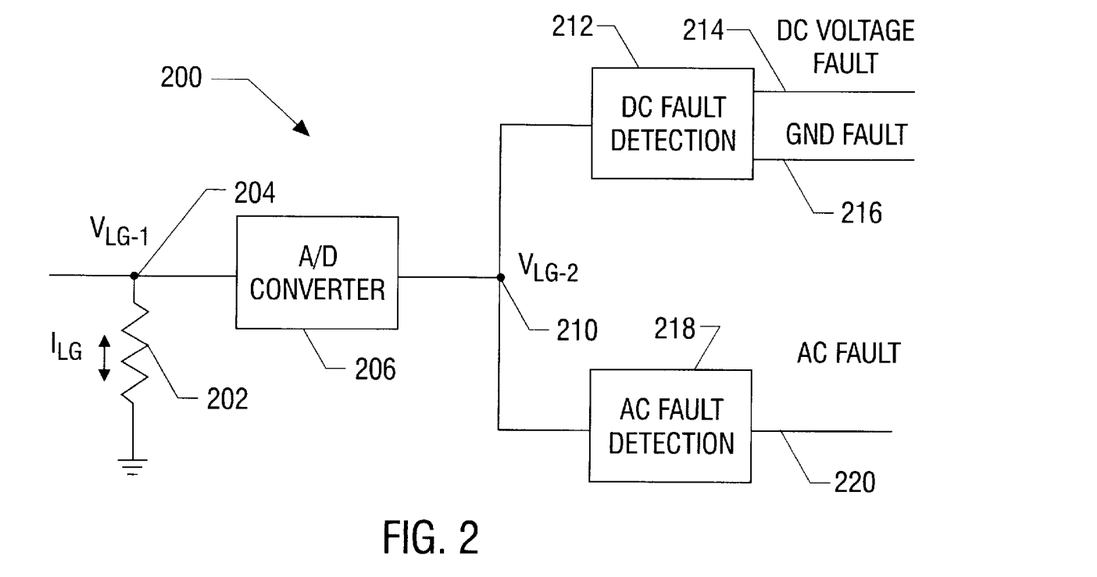
FIG. 2 illustrates one embodiment of a programmable fault detection circuit in accordance with the present invention.

Referring now to FIG. 2, one embodiment of a programmable fault detection circuit 200 is illustrated. A current proportional to the longitudinal current $I_{LG}$ passes through resistance 202 to provide a voltage $V_{LG-1}$ at node 204. The voltage $V_{LG-1}$ is input to the analog-to-digital (A/D) converter 206, which converts the analog voltage $V_{LG-1}$ to a digital voltage value $V_{LG-2}$ illustrated at node 210.

The digital representation $V_{LG-2}$ at node 210 of the analog voltage $V_{LG-1}$ is provided to the DC fault detection circuitry 212 and the AC fault detection circuitry 218. The DC fault detection circuitry 212 detects subscriber line faults having a DC nature. For example, the DC fault detection circuitry 212 determines whether an external DC voltage has affected the integrity of the subscriber loop, and generates a DC voltage fault represented on line 214 in response thereto. Similarly, the DC fault detection circuitry 212 detects whether the subscriber loop voltage has been shorted to a ground potential as represented by the ground fault signal represented on line 216.

The voltage $V_{LG-2}$ is also provided to the AC fault detection circuitry 218. The AC fault detection circuitry 218 detects faults on the subscriber loop having AC characteristics. For example, power lines carrying AC voltages may short to telephone lines at, or connected to, the local subscriber loop. The AC fault detection circuitry 218 detects such short circuits, and provides an AC fault represented on line 220 in response thereto.

Figure 3:
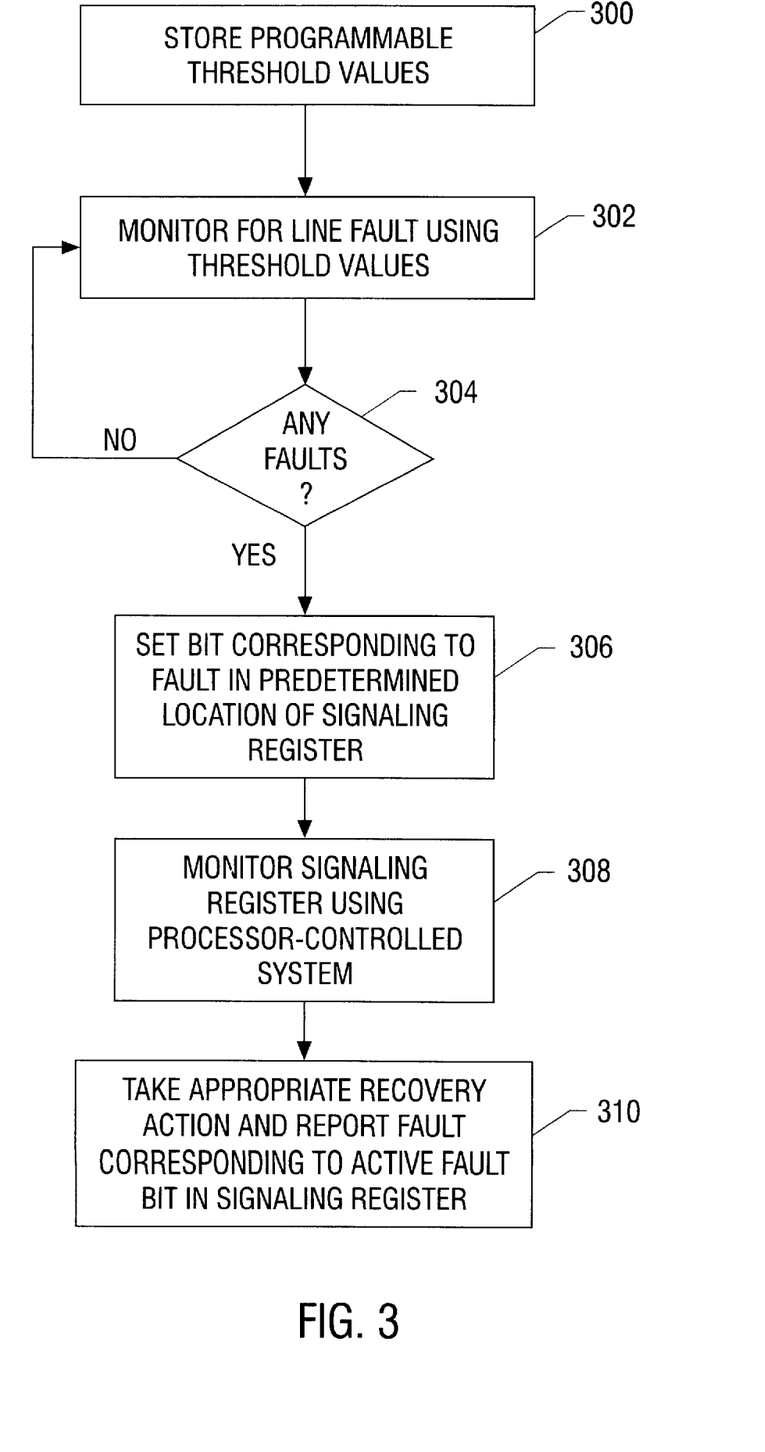
FIG. 3 is a flow diagram illustrating one embodiment of the programmable nature of the fault detection of the present invention.

Referring now to FIG. 3, a flow diagram illustrating one embodiment of the programmable nature of the fault detection in accordance with the present invention is illustrated. A variety of different predetermined threshold values, corresponding to fault reference points, are stored 300 in a memory device. These threshold values are software-programmable, thereby conserving semiconductor real estate and cost, as well as providing flexibility of use.

Subscriber loop line power characteristics are monitored 302 using the fault references corresponding to the predetermined threshold values stored in the memory device. Where no subscriber loop faults are detected 304, the programmable fault detection circuitry continues to monitor 302 for line faults using the predetermined threshold values. Where faults are detected 304, the presence of the fault is registered. In one embodiment, a bit corresponding to the fault is set 306 in a predetermined location of a signaling register or other memory location. The fault bit represents a flag for the particular subscriber loop fault which it represents.

In one embodiment of the invention, a processor-controlled system is used to monitor 308 the signaling register to act on the particular subscriber line fault which has been set forth in the signaling register or other memory location. The monitoring of the register may be accomplished by way of periodic software polling. Other embodiments for monitoring the signaling register may also be used, including generating interrupts for use in an interrupt-controlled processing system.

The processor-controlled system may be programmed to take an appropriate recovery action and identify the fault, as indicated at block 310. The recovery action and fault reporting is based on the particular one of the bit identifiers set in the signaling register. In the case of an interrupt-driven system, a particular interrupt routine can be initiated upon the occurrence of the corresponding interrupt. Recovery actions include, among other things, reporting the fault to the central office to indicate that repair is necessary.

Figure 4:
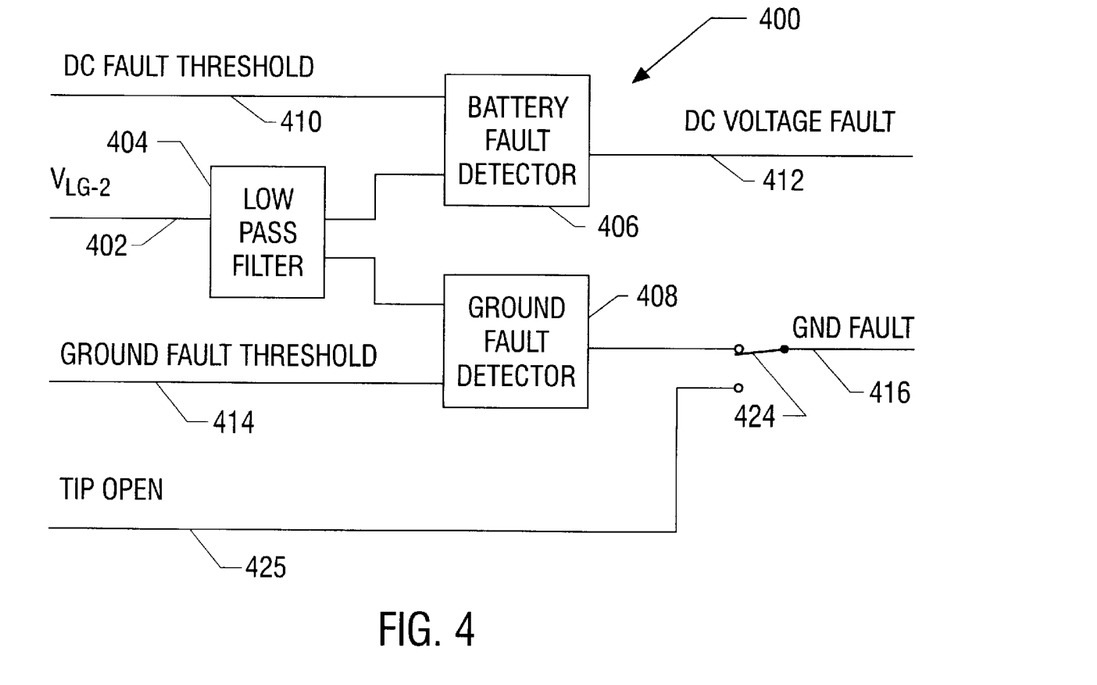
FIG. 4 is a block diagram of one embodiment of a DC fault detection circuit in accordance with the present invention.

FIG. 4 is a block diagram of one embodiment of a DC fault detection circuit 400 in accordance with the present invention. As was described in connection with FIG. 2, the voltage $V_{LG-1}$, generated by passing the longitudinal current $I_{LG}$ through a resistance, is converted to a digital representation $V_{LG-2}$ of the analog voltage in order to provide a digital input to the DC fault detection circuit 400. The digital representation of the voltage $V_{LG-2}$ is shown on line 402 as an input to the low pass filter 404. The low pass filter 404 passes only low frequency signals, particularly DC signals, and filters out AC signals, as is known by those skilled in the art.

When the AC components have been filtered from the $V_{LG-2}$ signal, the filtered signal is provided to the battery fault detection circuitry 406 and the ground fault detection circuitry 408. The battery fault detection circuitry 406 determines whether the telephone tip line 110 has been shorted to the battery. A preset value, 10 ma in one example, is the threshold current which is compared to $I_{LG}$ (as a voltage $V_{LG}$) to determine whether a short circuit to the battery has occurred. The battery fault detection circuit 406 is configured to compare the filtered $V_{LG-2}$ digitized voltage signal with a DC fault threshold illustrated as an input to the battery fault detector 406 on line 410. The signal on line 410 is software programmable, providing for flexibility in modifying the reference point at which a DC voltage fault on line 412 will be identified.

The ground fault detection circuit 408 determines whether the telephone ring line 108 has been shorted to ground. The ground fault detection circuit 408 is configured to compare the filtered $V_{LG-2}$ digitized voltage signal with the ground fault threshold shown on line 414, and to produce the ground fault labeled GND fault 416 in response thereto.

The ground fault detection circuit 408 may optionally be bypassed in the event that a private branch exchange (PBX) system, key telephone system, or other similar private telephone system is used. In a PBX or similar system, central office line circuits are optionally wired for ground start operation, versus loop start operation. As is known in the art, ground start operation involves grounding the ring side of the line at the PBX immediately upon originating a call. By detecting the ring ground, the CO is alerted to the line seizure before ringing begins. When the PBX seizes the ring lead, a call origination sequence occurs. Due to the nature of this signalling process, the seizure of the ring lead is the same as a fault between ring and ground. The switch 424 allows the generation of a GND fault on line 416 to be bypassed by activating the "tip open" signal on line 425, which indicates that a PBX or other private telephone system is used.

Figure 5:
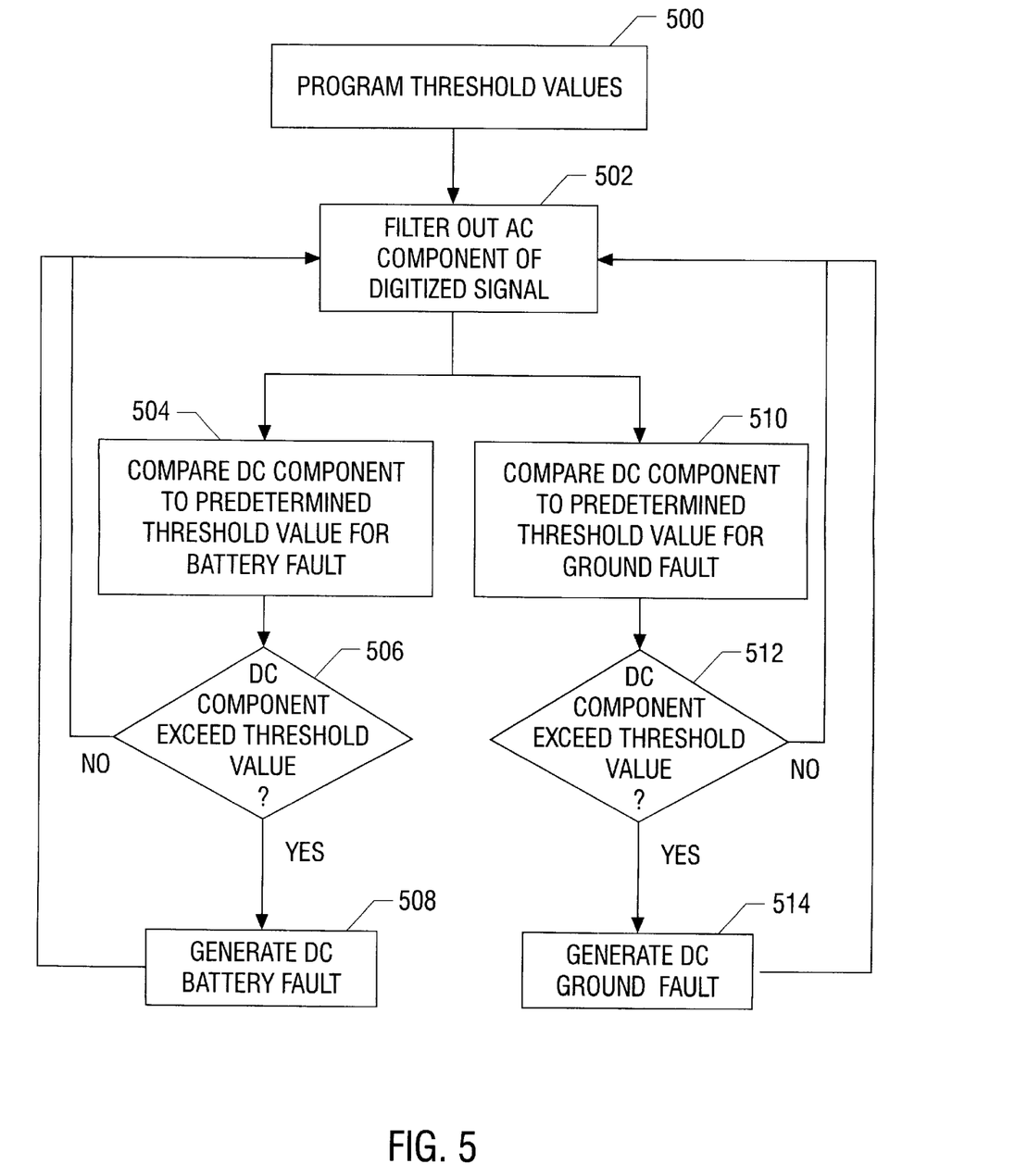
FIG. 5 is a flow diagram illustrating one embodiment of the ground fault detection and battery fault detection used to generate a DC power fault.

FIG. 5 is a flow diagram illustrating one embodiment of the ground fault detection and battery fault detection used to generate a DC power fault. The DC threshold values are programmed 500 via software. The AC component of the digitized voltage signal $V_{LG-2}$ is filtered off, in order to leave a substantially DC portion of the $V_{LG-2}$ signal.

The filtered DC component of $V_{LG-2}$ is represented in a digital form, and is compared 504 to the predetermined DC threshold value for a battery fault. If the filtered DC component does not exceed the DC battery fault threshold value, no fault is generated, and processing returns to block 502 to continue monitoring. If it is determined 506 that the filtered DC component does exceed the predetermined DC battery fault threshold value, a DC battery fault is generated 508.

The digital representation of the filtered DC component of $V_{LG-2}$ is also compared 510 to a predetermined threshold value for a ground fault. If the DC component does not exceed the DC ground fault threshold value, no fault is generated, and processing returns to block 502 to continue monitoring. If it is determined 512 that the filtered DC component exceeds the predetermined DC ground fault threshold value, a DC ground fault is generated 514.

Figure 6:
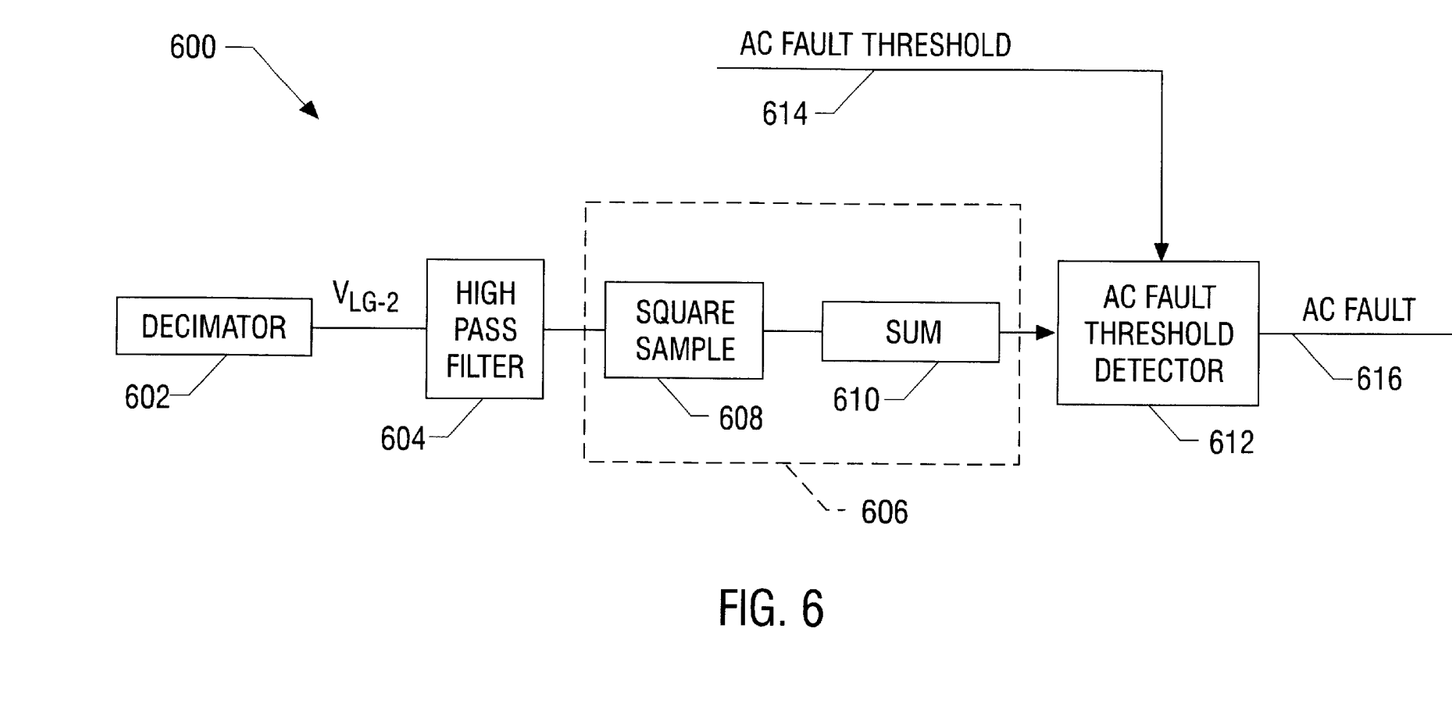
FIG. 6 is a block diagram of one embodiment of an AC fault detection circuit in accordance with the present invention.

FIG. 6 is a block diagram of one embodiment of an AC fault detection circuit 600 in accordance with the present invention. As was described in connection with FIG. 2, the AC fault detection circuit 218 receives the digital $V_{LG-2}$ signal to determine whether an AC fault exists. In the embodiment of FIG. 6, a decimator 602 is used to average the incoming signal. Data comes in at a sample rate that is faster than necessary, but only enough information needs to be retained to satisfy Nyquist's theorem. Nyquist's theorem states that if an analog signal is sampled at a rate twice the highest frequency contained within its bandwidth, enough intelligence is retained in the samples to reconstruct the original signal. The decimator 602 reduces the sample rate, and performs filtering on the higher frequencies, thereby acting as an averaging low pass filter.

The decimated $V_{LG-2}$ signal is filtered at the high pass filter 604 to pass only the AC portion of the $V_{LG-2}$ signal. The signal quantifier 606 determines a phase-independent power quantity for the AC signal. This is performed to provide a measurable quantity value for the time-dependent AC signal. This quantity is independent of the time variance of the AC signal, which allows it to be compared to a predetermined AC threshold value shown on line 614. The AC fault threshold detector 612 compared the AC threshold value to the quantified signal, and generates an AC fault signal, shown on line 616, when the quantified signal is greater than the predetermined AC fault signal. It should be recognized that the comparison performed at the threshold detectors of the present invention, such as the AC fault threshold detector 612, may trigger the fault when the measured value is equal to the threshold value, or when the measured value has surpassed the threshold value.

The signal quantifier 606 therefore determines a non-time-dependent magnitude of the AC signal. The software of the present invention performs this function by squaring each of the samples of the AC signal, represented at block 608. Each of the samples taken over a predetermined period are added together at the summing element 610, which in one embodiment of the invention is software-implemented. The predetermined threshold value takes into account what the time period is which corresponds to the number of samples taken. For example, The number of samples summed at summing element 610 may be taken over one full period or an integer number of periods, and the programmable threshold value would be set to a value corresponding to one full period or an integer number of periods. The number of samples need not be taken over exactly one full period, if the resulting error is acceptable. For example, in one embodiment of the invention, nine samples from a 250 Hz sample rate are used to determine the magnitude of the signal for both a 50 Hz (European) and a 60 Hz power frequency. AC faults are most often caused by short-circuits to 50 or 60 Hz power lines. If this were to be taken over exact integers of periods, 8 and 10 samples would be taken over two periods. However, 9 samples was used to recognize both AC power frequencies, realizing that a small, acceptable error would be encountered.

The signal quantifier 606 generates a signal that is proportional to the root-mean-square (RMS) value of the AC signal. An RMS value is calculated by taking the square root of the average of the square of the value of the function taken throughout one period. The RMS value when applied to alternating voltage and current is the "effective value"; that is, it is a means of expressing AC voltage in terms of DC.

Figure 7:
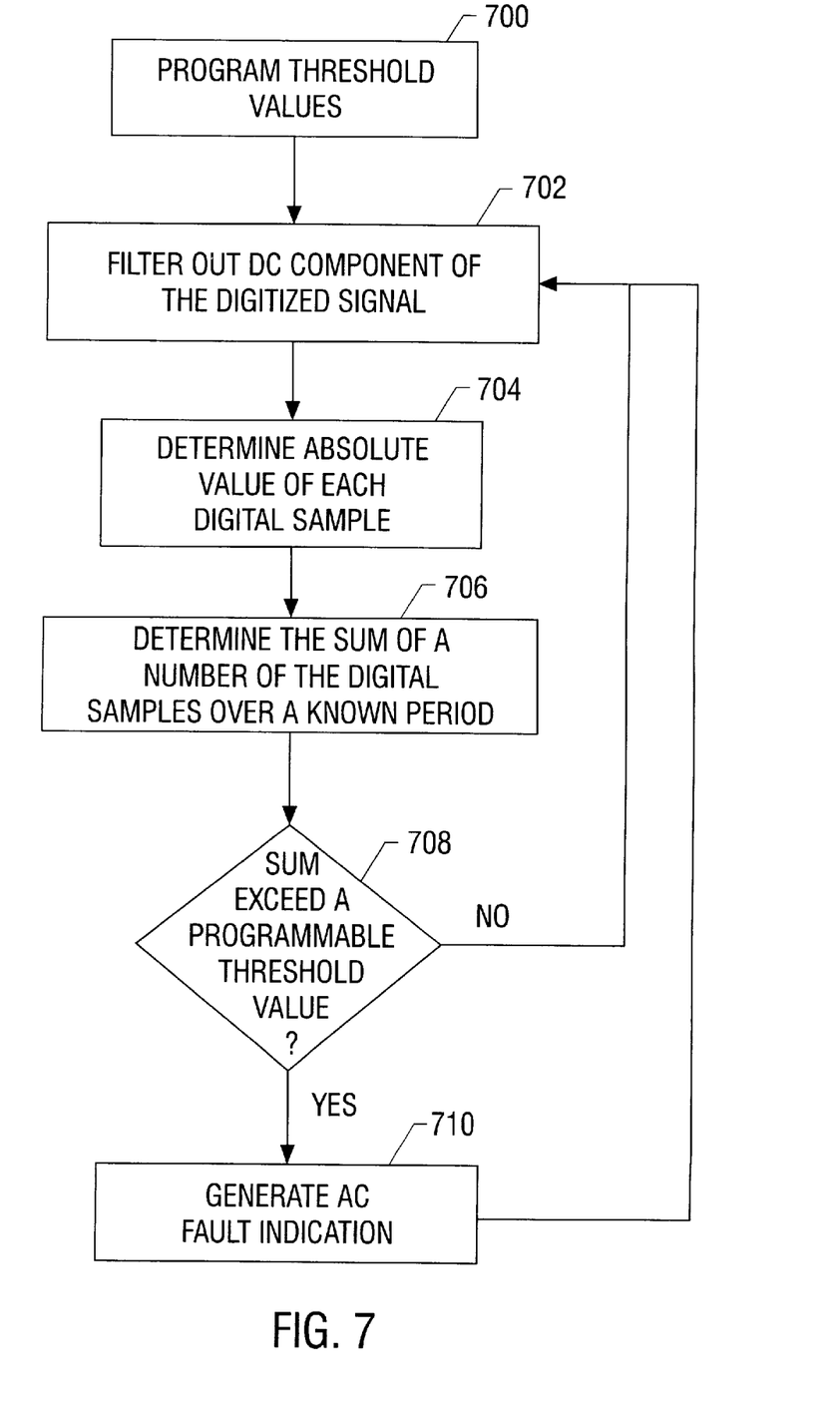
FIG. 7 is a flow diagram illustrating one manner of quantifying the AC signal for use with the present invention.

FIG. 7 is a flow diagram illustrating one manner of quantifying the AC signal for use with the present invention. The AC threshold value, calculated for a predetermined time period, is programmed 700 into the software-implemented system. The DC component of the digitized telephone line signal ($V_{LG-2}$) is filtered out 702 to be left with a substantially AC signal. Samples of the digitized telephone line signal are taken at a predetermined rate, and the absolute value of each digital sample is determined 704. The sum of a number of the digital samples over a known period is determined 706, which provides a value which represents the AC voltage in terms of a DC value, and is proportional to the RMS value. If the sum does not exceed the threshold, no fault is identified. If it is determined 708 that the sum does exceed the programmed threshold value, an AC fault indication is generated 710.

In one embodiment of the invention, a fault status memory register is set to indicate the occurrence of an AC fault. The fault status memory register can take the appropriate fault recovery action upon recognition of a set flag in the fault status register. This can be accomplished by polling the fault status register, or via an interrupt-driven system.

As noted above, the present invention provides a system and method for providing software-implemented testing of telephone subscriber line power conditions, off-site from the central office, using programmable fault thresholds. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A user-controlled fault detection system for detecting subscriber line faults including resistive faults and foreign voltages on a telephone subscriber line, comprising:
    a user interface to enter user-programmable threshold values corresponding to subscriber line fault conditions;
    a subscriber line fault detection circuit coupled to a respective one or more of the telephone subscriber lines at a subscriber line interface, wherein the subscriber line interface provides an interface between each of the one or more telephone subscriber lines and an associated central switching office, the subscriber line fault detection circuit comprising:
        (a) a fault threshold memory removably coupled to the user interface to receive and store the generated threshold values; and
        (b) a processing unit configured and arranged to compare signal attributes collected from the telephone subscriber line at the subscriber line interface to the generated threshold values stored in the fault threshold memory, and to identify an occurrence of a fault corresponding to a predetermined condition introduced onto the telephone subscriber line in response thereto, and
    wherein the subscriber line fault detection circuit continuously monitors the signal attributes and detects the faults on its corresponding telephone subscriber lines at the subscriber line interface without the need for subscriber line switching at the central switching office changing the operational state of the subscriber line.

2. The user-controlled fault detection system as in claim 1, wherein the user-controlled fault detection system is coupled to the telephone subscriber line at the subscriber line interface.

3. The user-controlled fault detection system as in claim 1, further comprising a fault status register to store the identified faults.

4. The user-controlled fault detection system as in claim 3, wherein the processing unit is further configured and arranged to recognize faults stored in the fault status register, and to report the identified fault to a central office.

5. The user-controlled fault detection system as in claim 4, wherein the processing unit is further configured and arranged to receive an interrupt signal and execute an fault handling interrupt routine in response to the recognition of a corresponding one of the faults being stored in the fault status register.

6. The user-controlled fault detection system as in claim 3, wherein the processing unit is further configured and arranged to poll the fault status register to identify the faults stored in the fault status register.

7. A user-controlled fault detection system for detecting AC and DC power faults on a telephone subscriber line, comprising:
    a fault threshold memory to store programmable AC and DC threshold values;
    a DC fault detection circuit having reference inputs to receive the programmable DC threshold values from the fault threshold memory, and to generate DC fault signals upon identifying DC signals on the telephone line signal at the subscriber line interface at levels outside limits of the programmable DC threshold values;
    an AC fault detection circuit having reference inputs to receive the programmable AC threshold values from the fault threshold memory, and to generate AC fault signals upon identifying AC power levels on the telephone line signal at the subscriber line interface at levels outside limits of the programmable AC threshold values; and
    wherein the user-controlled fault detection system continuously monitors the DC signals and AC power levels, and generates the DC and AC fault signals, at the subscriber line interface without the need for subscriber line switching at the central switching office changing the operational state of the subscriber line.

8. The user-controlled fault detection system as in claim 7, wherein the DC fault detection circuit and the AC fault detection circuit are implemented using a software-programmable processing system.

9. The user-controlled fault detection system as in claim 8, wherein the software-programmable processing system further comprises:
    a software-implemented low pass filter to provide a DC signal by removing AC components from the telephone line signal prior to input to the DC fault detection circuit; and
    a software-implemented high pass filter to provide an AC signal by removing DC components from the telephone line signal prior to input to the AC fault detection circuit.

10. The user-controlled fault detection system as in claim 9, wherein the DC fault detection circuit comprises a battery fault detector to compare the DC threshold values to the DC signals, and to generate the DC fault signal when the battery fault detector determines that a DC battery power signal, having a greater magnitude than the DC threshold value, has been introduced on the telephone line.

11. The user-controlled fault detection system as in claim 7, wherein the telephone subscriber line comprises a two-wire cable capable of transmitting standard telephone audio signals and data.

12. The user-controlled fault detection system as in claim 7, wherein the AC fault detection circuit comprises a software-implemented signal quantifier to generate a value proportional to a phase-independent, steady-state representation of an AC signal on the telephone subscriber line.

13. The user-controlled fault detection system as in claim 12, wherein the AC fault detection circuit further comprises an AC fault signal comparator to compare the user-programmable AC threshold values to the value generated by the software-implemented signal quantifier, and to generate the AC fault signal when the value generated by the software-implemented signal quantifier surpasses the AC threshold value.

14. A power fault detection system for use in identifying power faults on a telephone line, comprising:
 a fault threshold memory to store a threshold value corresponding to a subscriber line fault condition;
 a signal quantifier to generate a value proportional to a phase-independent, steadystate representation of an AC signal introduced at a subscriber line interface on the telephone line;
 a processing unit configured and arranged to compare the generated value to the threshold value, and to identify the AC signals on the telephone line which exceed the threshold value; and
 wherein the power fault detection system continuously monitors the AC signal on the telephone line at the subscriber line interface independent of subscriber line switching at a central switching office changing the operational state of the subscriber line.

15. The system as in claim 14, wherein the signal quantifier comprises:
 a software-implemented signal sampler to identify a plurality of signal samples of the AC signal for a predetermined period of the AC signal;
 a software-implemented multiplier to mathematically square each of the plurality of signal samples; and
 a software-implemented summing segment to add the squares of each of the plurality of signal values over the predetermined period.

16. The power fault detection system as in claim 14, further comprising a threshold generation unit configured and arranged to generate the threshold values in response to user input.

17. The power fault detection system as in claim 16, wherein the processing unit is further configured and arranged to implement, via software, the signal quantifier and the threshold generation unit.

18. The power fault detection system as in claim 16, wherein the threshold values are software-programmable in response to the user input.

19. The power fault detection system as in claim 14, wherein the signal quantifier generates a value related to the root-mean-square (RMS) value of the AC signal introduced on the telephone line.

20. A software-implemented method for identifying faults on a telephone subscriber line, comprising:

receiving input from a user interface corresponding to desired fault threshold values for telephone subscriber line power signals;
 generating and storing digital fault threshold values from the input received;
 continuously monitoring actual power signals from the telephone subscriber line at a subscriber line interface that provides an interface between the telephone subscriber line and an associated central office, wherein the monitoring is independent of subscriber line switching at the central office changing the operational state of the subscriber line;
 comparing the actual power signals collected from the telephone subscriber line at the subscriber line interface to the digital fault threshold values; and
 identifying deviant power signals introduced on the telephone subscriber line at the subscriber line interface in response thereto.

21. The software-implemented method for identifying power faults on a telephone subscriber line as in claim 20, wherein generating and storing digital fault threshold values comprises generating and storing AC and DC digital fault threshold values.

22. The software-implemented method for identifying power faults on a telephone subscriber line as in claim 21, further comprising filtering the actual power signals collected from the telephone subscriber line in order to separate AC power signals collected from the telephone subscriber line from DC power signals collected from the telephone subscriber line.

23. The software-implemented method for identifying power faults on a telephone subscriber line as in claim 22, wherein identifying deviant power signals comprises generating AC power fault signals when the AC power signals collected from the telephone subscriber line reach the AC digital fault threshold values.

24. The software-implemented method for identifying power faults on a telephone subscriber line as in claim 22, wherein identifying deviant power signals comprises generating DC power fault signals when the DC power signals collected from the telephone subscriber line reach the DC digital fault threshold values.

25. The software-implemented method for identifying power faults on a telephone subscriber line as in claim 20, further comprising storing an indication of the identified deviant power signals in a fault status register.

26. The user-controlled fault detection system as in claim 1, wherein the subscriber line fault detection circuit is off-site from the central switching office.

27. The user-controlled fault detection system as in claim 1, wherein the subscriber line fault detection circuit concurrently monitors the signal attributes and detects the faults of each of its corresponding telephone subscriber lines at the subscriber line interface.

28. The user-controlled fault detection system as in claim 1, wherein the subscriber line fault detection circuit continuously monitors the signal attributes of its corresponding telephone subscriber lines at the subscriber line interface.

29. The user-controlled fault detection system as in claim 7, wherein the user-controlled fault detection system continuously monitors the DC signals and AC power levels on the telephone subscriber line.

\* \* \* \* \*